US012643685B2

(12) United States Patent
Lee

(10) Patent No.: US 12,643,685 B2
(45) Date of Patent: Jun. 2, 2026

(54) METHOD AND APPARATUS FOR GROUND TARGET PRECISION ORIENTATION FOR SATELLITE IMAGE ACQUISITION

(71) Applicant: KOREA AEROSPACE RESEARCH INSTITUTE, Daejeon (KR)

(72) Inventor: Seon Ho Lee, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 399 days.

(21) Appl. No.: 18/450,037

(22) Filed: Aug. 15, 2023

(65) Prior Publication Data

US 2024/0067364 A1    Feb. 29, 2024

(30) Foreign Application Priority Data

Aug. 29, 2022    (KR) ......................... 10-2022-0108627

(51) Int. Cl.
B64G 1/24        (2006.01)
B64G 1/10        (2006.01)
(Continued)

(52) U.S. Cl.
CPC ........... B64G 1/244 (2019.05); B64G 1/1021 (2013.01); B64G 1/242 (2013.01); G05D 1/0094 (2013.01);
(Continued)

(58) Field of Classification Search
None
See application file for complete search history.

(56) References Cited

U.S. PATENT DOCUMENTS

2018/0372882 A1* 12/2018 Lee ........................ G01S 19/256

FOREIGN PATENT DOCUMENTS

KR    10-2003-0046757 A    6/2003
KR    10-2012-0075961 A    7/2012
(Continued)

*Primary Examiner* — Vladimir Magloire
*Assistant Examiner* — Ashley Brown Raynal
(74) *Attorney, Agent, or Firm* — Rabin & Berdo, P.C.

(57)        ABSTRACT

Provided are a method and apparatus for ground target precision orientation for satellite image acquisition, in which the method includes: receiving a desired satellite position (P) for imaging from a ground station, and receiving a ground plan imaging time (T) or an algorithm execution time ($T_A$) from the ground station, in which the ground plan imaging time (T) is calculated according to the desired satellite position (P) for imaging at a ground-based orbit propagator, and the algorithm execution time ($T_A$) is set to be earlier than the ground plan imaging time (T) by a predetermined amount of time; and determining, based on a position error (E) calculated by using a difference between the desired satellite position (P) for imaging and the predicted satellite position (Q) output from the satellite-based orbit propagator, a closest satellite position ($Q_C$) and a closest satellite time ($T_C$) corresponding to when the satellite is closest to the desired satellite position (P) for imaging, and determining a corrected maneuvering attitude ($\vec{e},\theta$) for orienting the line-of-sight vector of an image capturing payload of the satellite to a ground target at the closest satellite position ($Q_C$).

13 Claims, 9 Drawing Sheets

(51) Int. Cl.
     G05D 1/00           (2006.01)
     H04N 23/60         (2023.01)
     H04N 23/695     (2023.01)

(52) U.S. Cl.
     CPC ............... G05D 1/08 (2013.01); H04N 23/64
                  (2023.01); H04N 23/695 (2023.01)

(56)             References Cited

FOREIGN PATENT DOCUMENTS

| KR | 10-2014-0025970 A | 3/2014 | |
| WO | WO-2020096145 A1 * | 5/2020 | ............ B64G 1/242 |
| WO | 2023-208943 A1 | 11/2023 | |

\* cited by examiner (unknown) actual orbit
= (satellite-based) predicted orbit (ground-based) predicted orbit ground surface

METHOD AND APPARATUS FOR GROUND TARGET PRECISION ORIENTATION FOR SATELLITE IMAGE ACQUISITION

CROSS-REFERENCE TO RELATED APPLICATION

This application claims priority to Korean Patent Application No. 10-2022-0108627, filed in the Korean Intellectual Property Office on Aug. 29, 2022, the entire contents of which are hereby incorporated by reference.

BACKGROUND

Technical Field

The disclosure relates to a method and apparatus for ground target precision orientation for satellite image acquisition.

Description of the Related Art

The ground station controlling the satellite predicts satellite orbit for a certain period of future time by using a ground-based orbit propagator so as to plan image acquisition mission.

For low orbiting (at altitude of 500-700 km) satellites, an orbit prediction error occurs in the along-track direction of the satellite track due to limited performance of the ground-based orbit propagator (e.g., 200 m of position error occurs after one day, and 1 km of position error occurs after 2 days, and this increases exponentially thereafter).

For ultra-low orbiting (at altitude of 200-300 km) satellites, the occurrence of orbit prediction error is higher than the low orbiting satellites due to increase in atmospheric drag. Further, the error occurs in the 3-axis direction rather than 1-axis direction, causing serious problems in the mission plan and operation.

FIG. 1 is a diagram provided to explain a problem that occurs when a satellite images a ground target according to an imaging plan established by using a related ground-based orbit propagator.

Referring to FIG. 1, first, the ground station may receive a desired satellite position (P) for imaging, and calculate, by using a ground-based orbit propagator, a ground plan imaging time (T) corresponding to the desired satellite position (P) for imaging. The desired satellite position (P) for imaging is a determined position at which a desired area for imaging can be imaged in a ground-based predicted orbit.

When the ground station transmits the ground plan imaging time (T) to the satellite, an image capturing payload mounted on the satellite starts capturing images of the ground target at the ground plan imaging time (T) and acquires the images.

However, since the ground-based predicted orbit includes orbit prediction errors, as illustrated in FIG. 1, it is actually located at a position (F) at the ground plan imaging time (T). Therefore, discrepancy occurs between an area desired to be imaged and an area actually imaged.

SUMMARY

A technical problem to be solved by the disclosure is to provide a method and an apparatus for precision orientation toward a ground target when acquiring images through a satellite optical camera or an imaging radar payload.

In order to accomplish the technical object mentioned above, a method according to the present disclosure may include receiving a desired satellite position (P) for imaging from a ground station, and receiving a ground plan imaging time (T) or an algorithm execution time $(T_A)$ from the ground station, in which the ground plan imaging time (T) may be calculated according to the desired satellite position (P) for imaging at a ground-based orbit propagator, and the algorithm execution time $(T_A)$ is set to be earlier than the ground plan imaging time (T) by a predetermined amount of time, determining, based on a position error (E) calculated by using a difference between the desired satellite position (P) for imaging and the predicted satellite position (Q) output from the satellite-based orbit propagator, a closest satellite position $(Q_C)$ and a closest satellite time $(T_C)$ corresponding to when the satellite is closest to the desired satellite position (P) for imaging, and determining a corrected maneuvering attitude $(\vec{e}, \theta)$ for orienting a line-of-sight vector of an image capturing payload of the satellite to a ground target at the closest satellite position $(Q_C)$.

The satellite-based orbit propagator may receive position $(P_A)$ and velocity $(V_A)$ of the satellite at the algorithm execution time $(T_A)$, and a waiting time (W) before imaging, and output the predicted satellite position (Q) as the position of the satellite at a time point when the waiting time (W) before imaging elapses from the algorithm execution time $(T_A)$.

The determining the closest satellite position $(Q_C)$ and the closest satellite time $(T_C)$ may include repeating calculating $\Delta T \cdot i$ as an i-th waiting time (W(i)) before imaging, in which i is a natural number and $\Delta T$ is a predetermined increment of the waiting time before imaging, receiving the i-th waiting time (W(i)) before imaging and the position $(P_A)$ and velocity $(V_A)$ of the satellite at the algorithm execution time $(T_A)$ from the satellite orbit propagator and calculating an i-th predicted satellite position (Q(i)), calculating an i-th position error (E(i)) corresponding to a difference between the i-th predicted satellite position (Q(i)) and the desired satellite position (P) for imaging, and comparing magnitudes of the i-th position error (E(i)) and the i−1-th position error (E(i−1)), while increasing i from '1' by '1' until the i-th position error (E(i)) is greater than the i−1-th position error (E(i−1)).

The determining the closest satellite position $(Q_C)$ and the closest satellite time $(T_C)$ may further include calculating the closest satellite position $(Q_C)$ and the closest satellite time $(T_C)$ by using the calculated waiting time (W(i)) before imaging and predicted satellite position (Q(i)).

The closest satellite position $(Q_C)$ and the closest satellite time $(T_C)$ may be calculated by Mathematical Formulas:

$$W_C = \frac{W(i) + W(i-1)}{2}, \quad Q_C = \frac{Q(i) + Q(i-1)}{2}, \quad T_C = T_A + W_C$$

The closest satellite position $(Q_C)$ and the closest satellite time $(T_C)$ may be calculated by applying a nonlinear interpolation method or a precision filtering method to the calculated waiting time (W(i)) before imaging and predicted satellite position (Q(i)).

The corrected maneuvering attitude $(\vec{e}, \theta)$ may include a maneuvering axis vector $(\vec{e})$ and a maneuvering angle $(\theta)$.

The maneuvering axis vector ($\vec{e}$) may be obtained by Mathematical Formula:

$$\vec{e} \frac{V_A}{\|V_A\|}.$$

The maneuvering angle ($\theta$) may be obtained by Mathematical Formula:

$$\theta = a\tan\left(\frac{\|P - Q_C\|}{h}\right),$$

when the ground target is located at a sub-satellite point of the satellite.

The maneuvering angle ($\theta$) may be obtained by Mathematical formula:

$$\theta = a\tan\left(\frac{\|P - Q_C\| + h \cdot a\tan\beta}{h}\right) - \beta,$$

when the ground target is located at a distance away from the sub-satellite point of the satellite by an offset angle $\beta$.

In an example, h may be a distance from the position ($P_A$) of the satellite obtained at the algorithm execution time ($T_A$) to the ground surface.

The corrected maneuvering attitude ($\vec{e}$, $\theta$) may be obtained by reflecting an earth curvature and an orbit curvature of the satellite predicted by the satellite-based orbit propagator.

In order to accomplish the technical object mentioned above, an apparatus according to the present disclosure may include a communication part configured to receive a desired satellite position (P) for imaging from a ground station, and receive a ground plan imaging time (T) or an algorithm execution time ($T_A$) from the ground station, in which the ground plan imaging time (T) may be calculated according to the desired satellite position (P) for imaging at a ground-based orbit propagator, and the algorithm execution time ($T_A$) may be set to be earlier than the ground plan imaging time (T) by a predetermined amount of time, and a processor configured to determine, based on a position error (E) calculated by using a difference between the desired satellite position (P) for imaging and the predicted satellite position (Q) output from the satellite-based orbit propagator, a closest satellite position ($Q_C$) and a closest satellite time ($T_C$) corresponding to when the satellite is closest to the desired satellite position (P) for imaging, and determine a corrected maneuvering attitude ($\vec{e}$,$\theta$) for orienting a line-of-sight vector of an image capturing payload of the satellite to a ground target at the closest satellite position ($Q_C$).

According to the disclosure, it is possible to precisely orient toward a desired ground target for the image acquisition through a satellite optical camera or an image radar payload.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
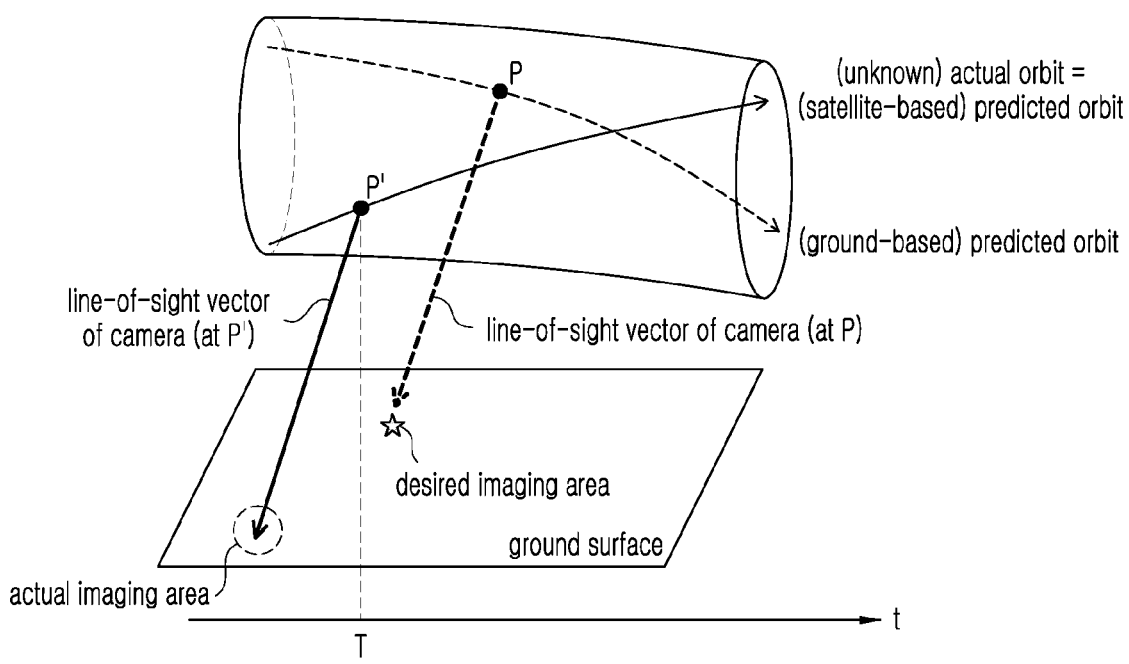
FIG. 1 is a diagram provided to explain a problem that occurs when a satellite images a ground target according to an imaging plan established by using a related ground-based orbit propagator.

Hereinafter, certain embodiments will be described in detail with reference to the accompanying drawings to help those with ordinary knowledge in the art easily achieve the present disclosure.

First, terms and symbols used herein will be described.

An orbit propagator is software (SW) that predicts position and velocity of a satellite in the near future of the orbit by fusing a satellite orbit model with observation data.

A ground-based orbit propagator is satellite orbit prediction software implemented at the ground station.

A ground-based predicted orbit is a satellite orbit for a certain future period of time predicted by the ground-based orbit propagator, and the normal prediction period is usually about 1 to 2 days.

A satellite-based orbit propagator is satellite orbit prediction software mounted on the satellite.

A satellite-based predicted orbit is a satellite orbit for a certain future period of time predicted by the satellite-based orbit propagator, and the normal prediction period is usually about 1 to 2 minutes, which is evaluated to be almost same as the actual orbit.

A global navigation satellite system (GNSS) receiver is a hardware (HW) device mounted on the satellite and providing position and velocity information of the satellite. In an example, GNSS may include US global positioning system (GPS), Russian global navigation satellite system (GLO-NASS), European navigation system (GALILEO), and the like, but not limited thereto.

A desired satellite position (P) for imaging may be planned at the ground station as a satellite position for imaging a ground target in the ground-based predicted orbit.

A ground plan imaging time (T) may be planned by the ground station as the time of the desired satellite position (P) for imaging in the ground-based predicted orbit.

An algorithm execution time $(T_A)$ may be the time to execute an algorithm for determining the closest position and time and an algorithm for determining a corrected maneuvering attitude. Note that, in order to perform the algorithms before acquiring images from the satellite, the algorithm execution time $(T_A)$ is set to a time earlier than the ground plan imaging time $(T)$. That is, $T_A < T$.

The satellite position $(P_A)$ and satellite velocity $(V_A)$ at the time of executing the algorithm are the position and velocity of the satellite orbit obtained at the algorithm execution time $(T_A)$ from the GNSS receiver mounted on the satellite.

Awaiting time $(W)$ before imaging represents a waiting time from the algorithm execution time $(T_A)$ as a reference time to any future imaging time in the satellite.

A predicted satellite position $(Q)$ represents the position of the satellite in the satellite-based predicted orbit at the time when the waiting time $(W)$ before imaging elapses from the algorithm execution time $(T_A)$ as a reference time.

A closest satellite position $(Q_C)$ represents the position of the satellite closest to the desired satellite position $(P)$ for imaging in the satellite-based predicted orbit.

A closest imaging time $(T_C)$ represents the time of the satellite at the closest satellite position $(Q_C)$ in the satellite-based predicted orbit.

A closest waiting time $(W_C)$ before closest imaging represents the waiting time from the algorithm execution time $(T_A)$ as a reference time to the closest imaging time $(T_C)$.

A corrected maneuvering attitude $(\vec{e}, \theta)$ is a corrected maneuvering attitude for orienting a line-of-sight vector of the image capturing payload of the satellite to the ground target, and includes a maneuvering axis vector $(\vec{e})$ and a maneuvering angle $(\theta)$. Using the corrected maneuvering attitude $(\vec{e}, \theta)$ it is possible to obtain quaternions, Euler angles, and direction cosine matrices to construct a attitude maneuvering command for the satellite.

A satellite altitude $(h)$ is a distance from the earth's surface to the satellite, and can be calculated using the satellite position $(P_A)$ at the time of executing the algorithm.

Figure 2:
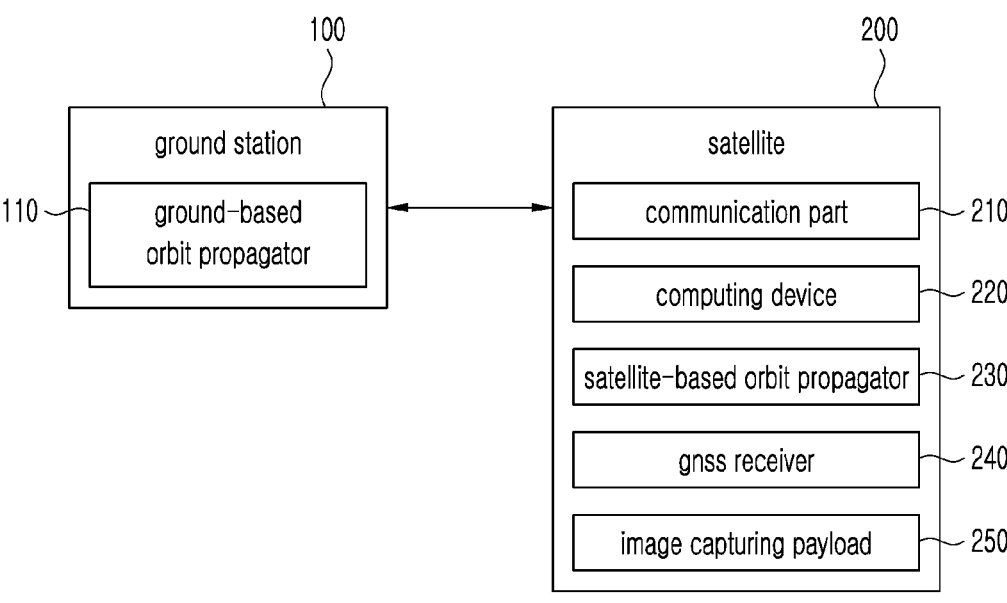
FIG. 2 is a block diagram illustrating configuration of a satellite image acquisition system according to an embodiment.

FIG. 2 is a block diagram illustrating configuration of a satellite image acquisition system according to an embodiment.

Referring to FIG. 2, the ground station 100 may include a ground-based orbit propagator 110.

The ground station 100 includes a communication device (not shown) that performs satellite communication with a satellite 200, and can exchange various information, commands, and data with the satellite 200.

The ground-based orbit propagator 110 may be implemented in the ground station 100, and may be implemented as software (SW) that predicts position and velocity of the satellite in the near future in the orbit by fusing a satellite orbit model with observation data.

The satellite 200 may include a communication part 210, a computing device 220, a satellite-based orbit propagator 230, a GNSS receiver 240, and an image capturing payload 250.

The communication part 210 allows the satellite 200 to exchange various types of information and data wirelessly with the ground station 100 through satellite communication.

The computing device 220 may include one or more memories and one or more processors. The one or more memories may store one or more instructions. Further, the memory may store data used in the computing device 220 for various tasks related to the algorithm for determining the closest position and time and the algorithm for determining a corrected maneuvering attitude. The one or more processors may execute a process corresponding to the instruction stored in the memory.

The satellite-based orbit propagator 230 may be implemented in the satellite 200, and may be implemented as software (SW) that predicts position and velocity of the satellite in the near future on the orbit by fusing the satellite orbit model with the observation data.

The GNSS receiver 240 may be implemented as a device that is mounted on the satellite 200 to measure the position and velocity of the satellite based on GNSS.

The image capturing payload 250 may be implemented as a device such as an optical camera, an electro-optical camera, an infrared camera, an imaging radar, etc., which can capture images of the ground and acquire the images.

Figure 3:
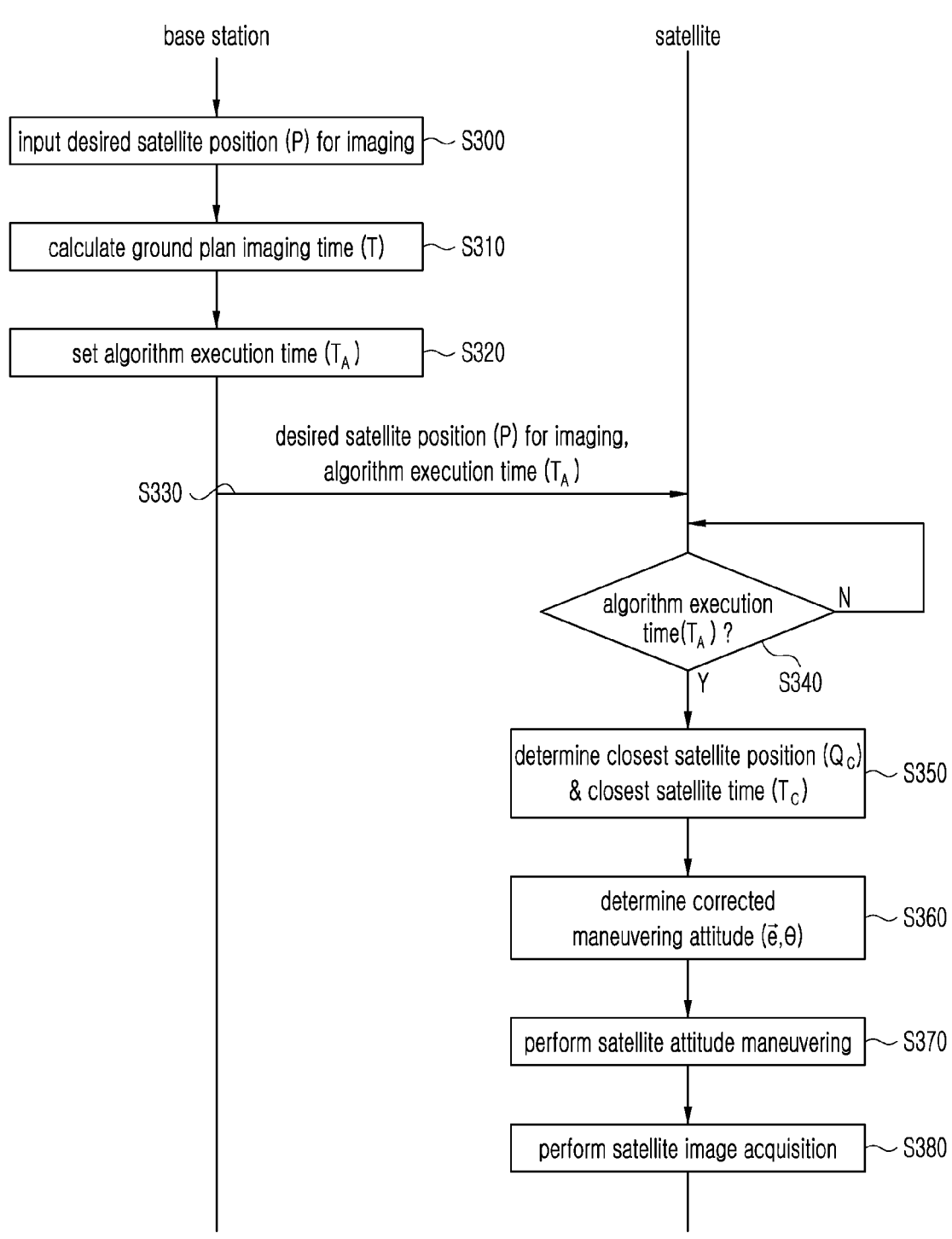
FIG. 3 is a diagram illustrating a satellite image acquisition procedure according to an embodiment.

FIG. 3 is a diagram illustrating a satellite image acquisition procedure according to an embodiment.

Referring to FIGS. 2 and 3, first, the ground station 100 may receive the desired satellite position $(P)$ for imaging from an external device or a ground station operator, at S300.

The ground station 100 may use the ground-based orbit propagator 110 to calculate the ground plan imaging time $(T)$ corresponding to the desired satellite position $(P)$ for imaging in the ground-based predicted orbit, at S310. Further, the ground station 100 may set the algorithm execution time $(T_A)$ that is earlier than the ground plan imaging time $(T)$ by a predetermined amount of time, at S320. The predetermined amount of time may be set so that there is a sufficient time from the algorithm execution time $(T_A)$ to complete calculating the closest satellite position $(Q_C)$ of the satellite, the closest imaging time $(T_C)$ and the corrected maneuvering attitude $(\vec{e}, \theta)$, and to complete maneuvering the satellite for orienting the line-of-sight vector of the image capturing payload 250 from the closest satellite position $(Q_C)$ to the ground target. Then, the ground station 100 may transmit the desired satellite position $(P)$ for imaging and the algorithm execution time $(T_A)$ to the satellite, at S330.

Depending on embodiments, the ground station 100 may skip the operation at S320. In this case, at S330, the ground station 100 may transmit, to the satellite, the ground plan imaging time $(T)$ instead of the algorithm execution time $(T_A)$. In addition, the computing device 220 may set the algorithm execution time $(T_A)$ that is earlier than the ground plan imaging time $(T)$ by a predetermined amount of time.

Then, when the current time is the algorithm execution time $(T_A)$ at S340-Y, the computing device 220 executes the algorithm for determining the closest position and time so as to determine the closest satellite position $(Q_C)$ and the closest satellite time $(T_C)$ corresponding to when the satellite is closest to the desired satellite position $(P)$ for imaging, based on a position error $(E)$ calculated by using a difference between the desired satellite position $(P)$ for imaging and the predicted satellite position $(Q)$, at S350.

The predicted satellite position $(Q)$ is output from the satellite-based orbit propagator 230. In detail, the satellite-based orbit propagator 230 receives the position $(P_A)$ and velocity $(V_A)$ of the satellite at the algorithm execution time $(T_A)$, and the waiting time $(W)$ before imaging, and outputs the position of the satellite in the satellite-based predicted orbit as the predicted satellite position $(Q)$ at a time point when the waiting time $(W)$ before imaging elapses from the algorithm execution time ($T_A$). The position ($P_A$) and velocity ($V_A$) of the satellite are provided by the GNSS receiver 240.

Figure 4:
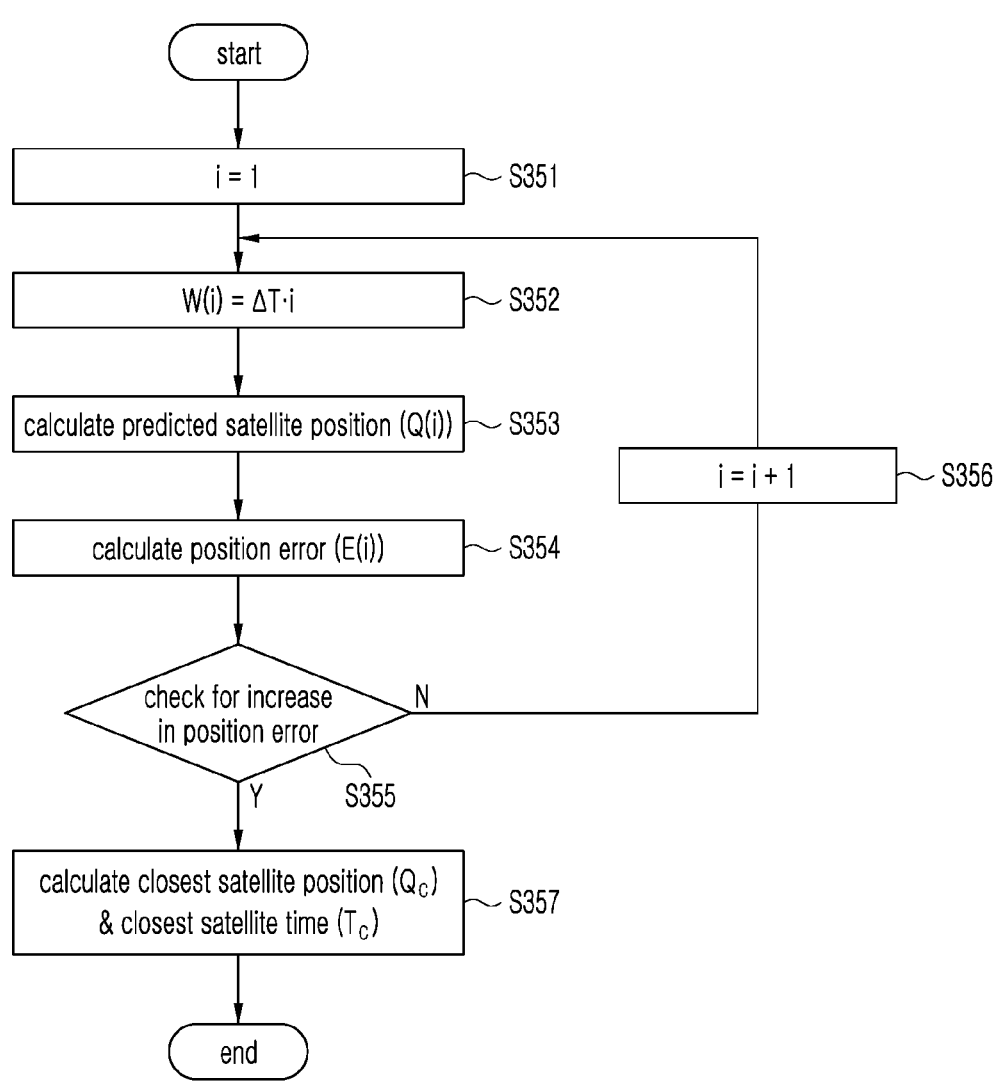
FIG. 4 is a flowchart illustrating operation sequence of algorithm for determining the closest position and time according to an embodiment.
Figure 5:
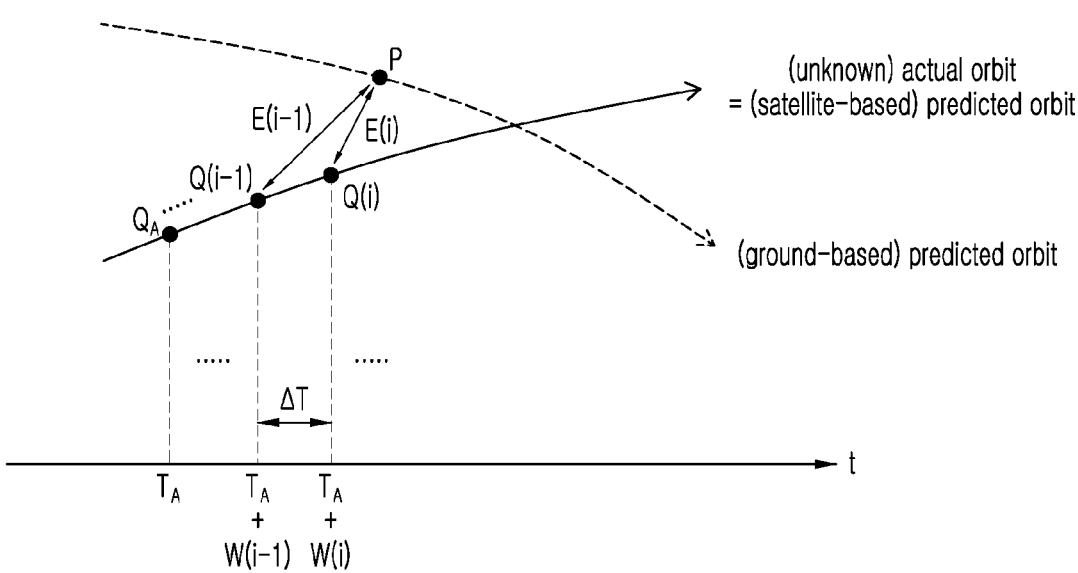
FIG. 5 is a diagram provided to explain concept of algorithm for determining the closest position and time according to an embodiment.

FIG. 4 is a flowchart illustrating operation sequence of algorithm for determining the closest position and time according to an embodiment, and FIG. 5 is a diagram provided to explain concept of algorithm for determining the closest position and time according to an embodiment.

Referring to FIG. 4, first, the computing device 220 may initialize the number of iterations (i) of the algorithm for determining the closest position and time to i=1, at S351.

Then, the computing device 220 may calculate $\Delta T \cdot i$ as the i-th waiting time (W(i)) before imaging, at S352. In an example, i is a natural number, and $\Delta T$ is a predetermined increment of the waiting time before imaging.

The computing device 220 may input, to the satellite orbit propagator 230, the i-th waiting time (W(i)) before image, and the position ($P_A$) and velocity ($V_A$) of the satellite provided from the GNSS receiver 240 at the algorithm execution time ($T_A$) so as to calculate the i-th predicted satellite position (Q(i)), at S353.

Then, the computing device 220 may calculate an i-th position error E(i) corresponding to a difference between the i-th predicted satellite position Q(i) and the desired satellite position (P) for imaging, at S354. The position error (E(i)) may be calculated by Mathematical Formula: E(i)=||Q(i)−P||, where, || || represents a magnitude of the vector.

Then, the computing device 220 may check whether the position error increases or not by comparing the i-th position error E(i) with the i−1-th position error E(i−1), at S355.

Referring to FIG. 5, when E(i)>E(i−1), it can be confirmed that there is the closest satellite position ($Q_C$) between Q(i) and Q(i−1) in the satellite-based predicted orbit.

Therefore, when E(i)≤E(i−1) at S355-N, it is determined that the predicted satellite position Q(i) has not reached the closest satellite position ($Q_C$), and i is increased by 1 at S356 and then the operations at S352 to S355 are repeated.

Meanwhile, when E(i)>E(i−1) at S355-Y, it is determined that the predicted satellite position (Q(i)) has reached the closest satellite position ($Q_C$), and the closest satellite position ($Q_C$) and the closest satellite time ($T_C$) may be calculated by using the previously calculated waiting time (W(i)) before imaging and predicted satellite position (Q(i)), at S357.

At S357, the closest satellite position ($Q_C$) and the closest satellite time ($T_C$) may be calculated by Mathematical Formulas:

$$W_C = \frac{W(i) + W(i-1)}{2}, \quad Q_C = \frac{Q(i) + Q(i-1)}{2}, \quad T_C = T_A + W_C$$

Meanwhile, according to an embodiment, in order to more precisely estimate the closest satellite position ($Q_C$) and the closest waiting time ($W_C$) before closest imaging, a nonlinear interpolation method or a precision filtering method instead of a linear average value can be applied.

Figure 6:
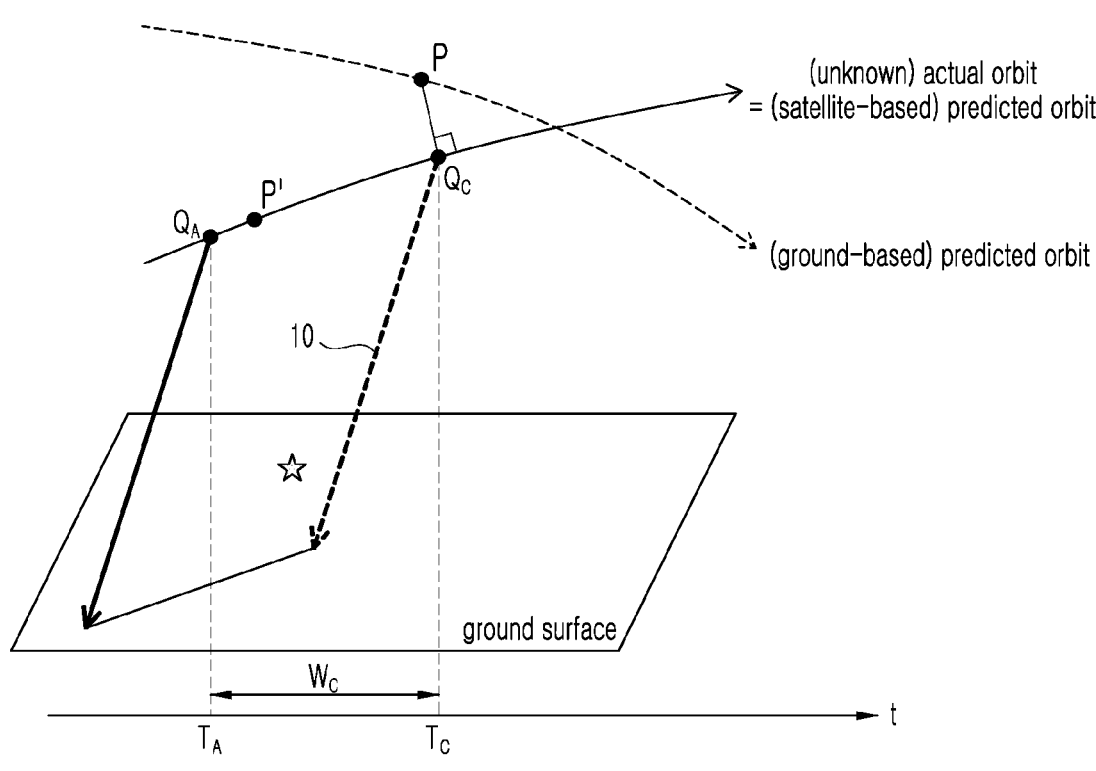
FIG. 6 is a diagram schematically illustrating the closest satellite position and the closest imaging time calculated according to an embodiment.

FIG. 6 is a diagram schematically illustrating the closest satellite position and the closest imaging time calculated according to an embodiment.

Referring to FIG. 6, it is illustrated that, after the closest waiting time ($W_C$) before imaging from the algorithm execution time ($T_A$), the satellite is located at the closest satellite position ($Q_C$) which is closest to the desired satellite position (P) for imaging in the satellite-based predicted orbit. Meanwhile, it can be seen that, when the line-of-sight vector of the image capturing payload 250 at the algorithm execution time ($T_A$) is maintained as it is, the line-of-sight vector 10 of the image capturing payload 250 at the closest satellite position ($Q_C$) cannot be oriented toward the ground target.

Accordingly, the computing device 220 may determine a corrected maneuvering attitude ($\vec{e}$,θ) for orienting the line-of-sight vector of the image capturing payload 250 at the closest satellite position ($Q_C$) to the ground target, at S360.

Figure 7:
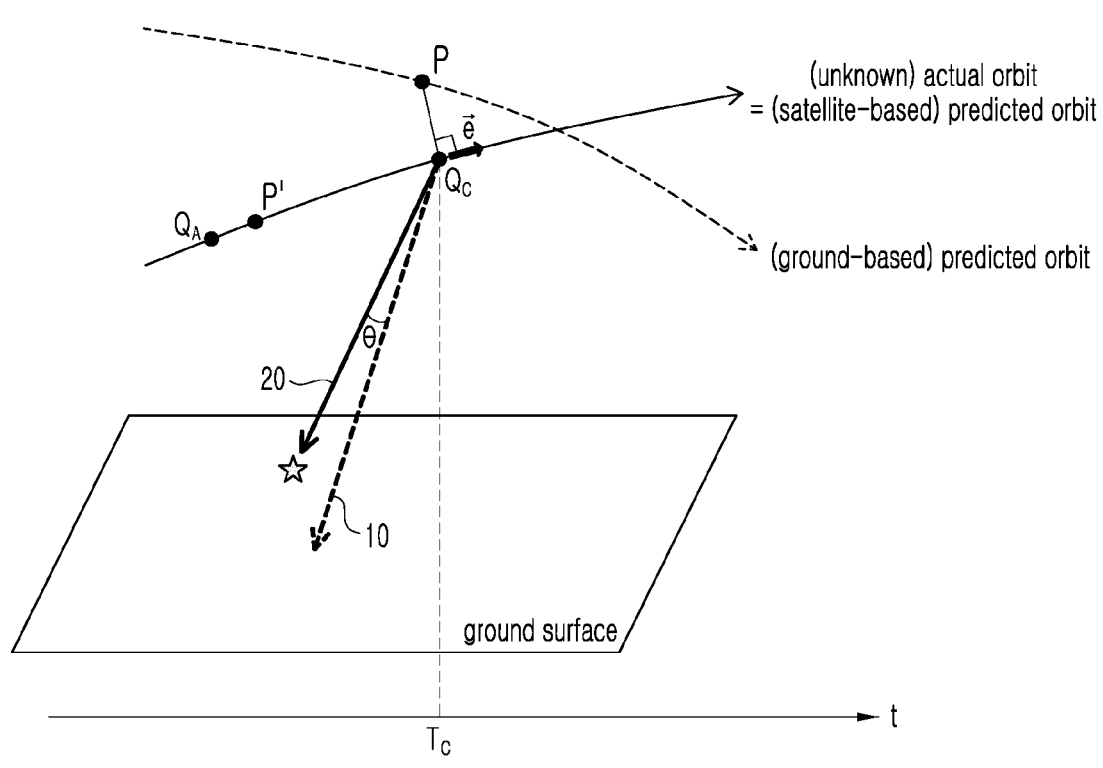
FIG. 7 is a diagram conceptually illustrating calculation of a corrected maneuvering attitude of a satellite according to an embodiment.

FIG. 7 is a diagram conceptually illustrating the calculation of the corrected maneuvering attitude of the satellite according to an embodiment.

Referring to FIGS. 6 and 7, at S360, the corrected maneuvering attitude ($\vec{e}$, θ) may include a maneuvering axis vector ($\vec{e}$) and a maneuvering angle (θ).

The maneuvering axis vector ($\vec{e}$) may be obtained by Mathematical Formula:

$$\vec{e} = \frac{V_A}{\|V_A\|}.$$

Difference between the maneuvering axis vector of the satellite at the algorithm execution time ($T_A$) and the maneuvering axis vector at the closest satellite position ($Q_C$) is so small that it may be neglected when calculating the line-of-sight vector of the image capturing payload 250. Therefore, the maneuvering axis vector at the algorithm execution time ($T_A$) can be deemed as the maneuvering axis vector at the closest satellite position ($Q_C$) for calculation.

The maneuvering angle (θ) is an angle formed by a line-of-sight vector 10 and another line-of-sight vector 20.

In this example, h may be calculated as a distance from the position ($P_A$) of the satellite obtained at the algorithm execution time ($T_A$) to the ground surface.

Figure 8:
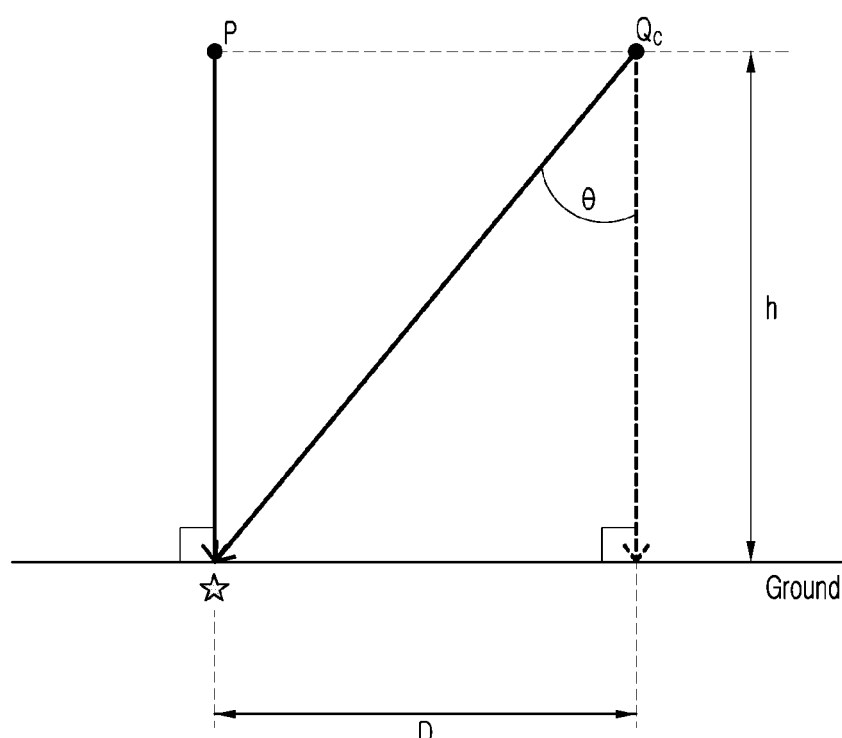
FIG. 8 is a diagram provided to explain concept of acquiring a maneuvering angle when a ground target is located at a sub-satellite point of the satellite according to an embodiment.

FIG. 8 is a diagram provided to explain concept of acquiring a maneuvering angle when a ground target is located at a sub-satellite point of the satellite according to an embodiment.

Referring to FIG. 8, the relationship between D, P, Qc, h and θ is expressed by Mathematical Formula:

$$D = \|P - Q_c\|$$

$$\therefore \theta = a\tan\left(\frac{D}{h}\right) = a\tan\left(\frac{\|P - Q_c\|}{h}\right)$$

Therefore, the maneuvering angle (θ) can be obtained by Mathematical Formula:

$$\theta = a\tan\left(\frac{\|P - Q_C\|}{h}\right),$$

when the ground target is located at a sub-satellite point of the satellite.

Figure 9:
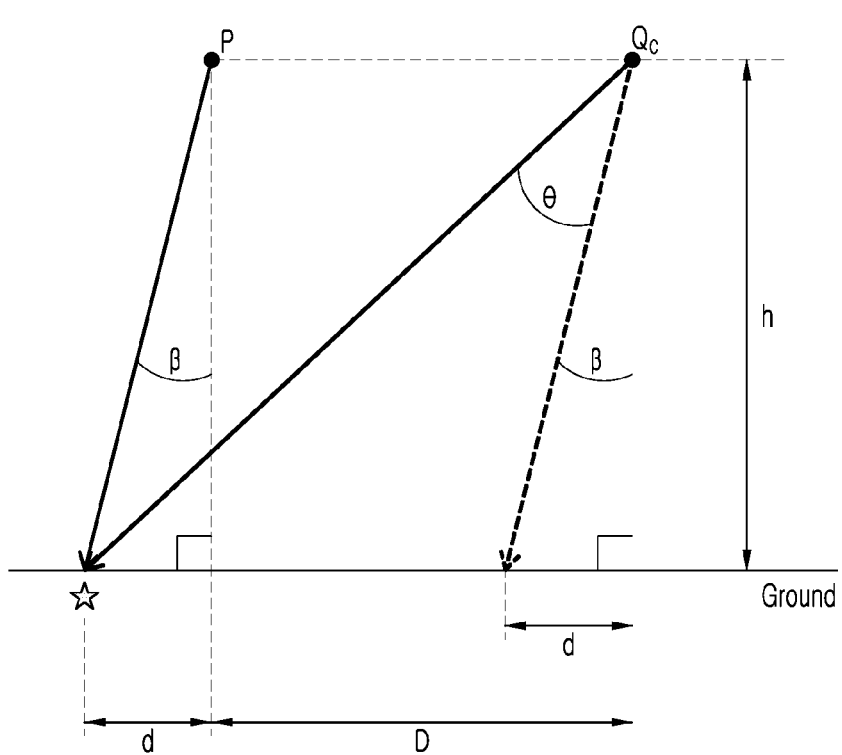
FIG. 9 is a diagram provided to explain concept of acquiring a maneuvering angle when a ground target is located at a distance away from a sub-satellite point of the satellite by an offset angle according to an embodiment.

FIG. 9 is a diagram provided to explain concept of acquiring a maneuvering angle when a ground target is located at a distance away from a sub-satellite point of the satellite by an offset angle according to an embodiment.

Referring to FIG. 9, the relationship between D, P, Qc, h, β, d and θ is expressed by Mathematical Formula:

Therefore, the maneuvering angle (θ) can be obtained by Mathematical Formula:

$$\theta = a\tan\left(\frac{\|P - Q_C\| + h \cdot a\tan\beta}{h}\right) - \beta,$$

when the ground target is located at a distance away from the sub-satellite point of the satellite by the offset angle β.

$$D = \|P - Q_c\|$$

$$d = h \cdot a\tan(\beta)$$

$$\tan(\theta + \beta) = \frac{d + D}{h}$$

$$\therefore \theta = a\tan\left(\frac{d + D}{h}\right) - \beta = a\tan\left(\frac{h \cdot a\tan(\beta) + \|P - Q_C\|}{h}\right) - \beta$$

In order to calculate values of the corrected maneuvering attitude ($\vec{e}$,θ) more precisely compared to those illustrated in FIGS. 8 and 9, the orbit curvature, the curvature of the earth, or the like predicted from the satellite-based orbit propagator may be considered.

Referring back to FIG. 3, the satellite 200 may perform satellite attitude maneuvering according to the corrected maneuvering attitude ($\vec{e}$,θ) corrected until the closest imaging time ($T_C$) so as to orient the line-of-sight vector of the image capturing payload 250 at the closest satellite position ($Q_C$) to the ground target, at S370.

Then, the satellite 200 may capture images of the ground target at the closest satellite position ($Q_C$) at the closest imaging time ($T_C$) so as to acquire the images, at S380.

The embodiments described above may be implemented as a hardware component, a software component, and/or a combination of a hardware component and a software component. For example, the devices, methods, and components described in the embodiments may be implemented by using one or more general computer or specific-purpose computer such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, it is described in certain examples that one processing device is used, but one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing device, or instruct the processing device independently or collectively to operate as desired. Software and/or data may be interpreted by the processing device or, in order to provide instructions or data to the processing device, may be embodied in any type of machine, component, physical device, virtual equipment, or computer storage medium or device, permanently or temporarily. The software may be distributed over networked computer systems and stored or executed in a distributed manner. The software and data may be stored on one or more computer-readable recording media.

The method according to the embodiments may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are performed in the order different from the method described above, and/or even when the components of the system, structure, device, circuit, and the like are coupled or combined in a form different from the way described above, or replaced or substituted by other components or equivalents, an appropriate result can be achieved.

The invention claimed is:

1. A method for ground target precision orientation for satellite image acquisition, comprising:

receiving a desired satellite position (P) for imaging from a ground station, and receiving either a ground plan imaging time (T) or an algorithm execution time ($T_A$) from the ground station, wherein when the ground plan imaging time (T) is received, the algorithm execution time ($T_A$) is determined to be earlier than the ground plan imaging time (T) by a predetermined amount of time, the ground plan imaging time (T) being calculated according to the desired satellite position (P) for imaging at a ground-based orbit propagator, and when the algorithm execution time ($T_A$) is received, the algorithm execution time ($T_A$) is used as the algorithm execution time without modification;

determining, based on a position error (E) calculated by using a difference between the desired satellite position (P) for imaging and a predicted satellite position (Q) output from a satellite-based orbit propagator, a closest satellite position ($Q_C$) and a closest satellite time ($T_C$) corresponding to when the satellite is closest to the desired satellite position (P) for imaging; and determining a corrected maneuvering attitude ($\vec{e}$,θ) for orienting a line-of-sight vector of an image capturing payload of the satellite to a ground target at the closest satellite position ($Q_C$), wherein the satellite-based orbit propagator receives, at the algorithm execution time ($T_A$), position ($P_A$) and velocity ($V_A$) of the satellite, and a waiting time (W) before imaging, and outputs the predicted satellite position (Q) as the position of the satellite for a time point when the waiting time (W) before imaging elapses after the algorithm execution time ($T_A$);

wherein determining the closest satellite position ($Q_C$) and the closest satellite time ($T_C$) comprises repeating:

calculating $\Delta T \cdot i$ as an i-th waiting time (W(i)) before imaging, wherein i is a natural number and $\Delta T$ is a predetermined increment of the waiting time before imaging;

receiving the i-th waiting time (W(i)) before imaging and the position ($P_A$) and velocity ($V_A$) of the satellite at the algorithm execution time ($T_A$) at the satellite-based orbit propagator and calculating an i-th predicted satellite position (Q(i));

calculating an i-th position error (E(i)) corresponding to a difference between the i-th predicted satellite position (Q(i)) and the desired satellite position (P) for imaging; and comparing magnitudes of the i-th position error (E(i)) and an i−1-th position error (E(i−1)), while increasing i from '1' by '1' until the i-th position error (E(i)) is greater than the i−1-th position error (E(i−1)).

2. The method of claim 1, wherein determining the closest satellite position ($Q_C$) and the closest satellite time ($T_C$) further comprises calculating the closest satellite position ($Q_C$) and the closest satellite time ($T_C$) by using the calculated waiting time (W(i)) before imaging and predicted satellite position (Q(i)).

3. The method of claim 2, wherein the closest satellite position ($Q_C$) and the closest satellite time ($T_C$) are calculated by Mathematical Formulas:

$$W_C = \frac{W(i) + W(i-1)}{2}, \quad Q_C = \frac{Q(i) + Q(i-1)}{2}, \quad T_C = T_A + W_C.$$

4. The method of claim 2, wherein the closest satellite position ($Q_C$) and the closest satellite time ($T_C$) are calculated by applying a nonlinear interpolation method or a precision filtering method to the calculated waiting time (W(i)) before imaging and predicted satellite position (Q(i)).

5. The method of claim 1, wherein the corrected maneuvering attitude ($\vec{e}$,θ) comprises a maneuvering axis vector ($\vec{e}$) and a maneuvering angle (θ), the maneuvering axis vector ($\vec{e}$) is obtained by Mathematical Formula:

$$\vec{e} = \frac{V_A}{\|V_A\|},$$

the maneuvering angle (θ) is obtained by Mathematical Formula:

$$\theta = a\tan\left(\frac{\|P - Q_C\|}{h}\right),$$

when the ground target is located at a sub-satellite point of the satellite, and the maneuvering angle (θ) is obtained by Mathematical Formula:

$$\theta = a\tan\left(\frac{\|P - Q_C\| + h \cdot a\tan\beta}{h}\right) - \beta,$$

when the ground target is located at a distance away from the sub-satellite point of the satellite by an offset angle β, where h is a distance from the position ($P_A$) obtained at the algorithm execution time ($T_A$) of the satellite to a ground surface.

6. The method of claim 1, wherein the corrected maneuvering attitude ($\vec{e}$,θ) is obtained based on an earth curvature and an orbit curvature of the satellite predicted by the satellite-based orbit propagator.

7. A non-transitory computer-readable recording medium recording a program for executing the method of claim 1 on a computer.

8. An apparatus for ground target precision orientation for satellite image acquisition, comprising:

a communication part configured to receive a desired satellite position (P) for imaging from a ground station, and receive either a ground plan imaging time (T) or an algorithm execution time ($T_A$) from the ground station, wherein when the ground plan imaging time (T) is received, the algorithm execution time ($T_A$) is determined to be earlier than the ground plan imaging time (T) by a predetermined amount of time, the ground plan imaging time (T) being calculated according to the desired satellite position (P) for imaging at a ground-based orbit propagator, and when the algorithm execution time ($T_A$) is received, the algorithm execution time ($T_A$) is used as the algorithm execution time without modification; and a processor configured to determine, based on a position error (E) calculated by using a difference between the desired satellite position (P) for imaging and a predicted satellite position (Q) output from a satellite-based orbit propagator, a closest satellite position ($Q_C$) and a closest satellite time ($T_C$) corresponding to when the satellite is closest to the desired satellite position (P) for imaging, and determine a corrected maneuvering attitude ($\vec{e}$,θ) for orienting a line-of-sight vector of an image capturing payload of the satellite to a ground target at the closest satellite position ($Q_C$), wherein the satellite-based orbit propagator receives, at the algorithm execution time ($T_A$), position ($P_A$) and velocity ($V_A$) of the satellite, and a waiting time (W) before imaging, and outputs the predicted satellite position (Q) as the position of the satellite for a time point when the waiting time (W) before imaging elapses after the algorithm execution time ($T_A$);

wherein, in order to determine the closest satellite position ($Q_C$) and the closest satellite time ($T_C$), the processor is configured to repeat:

calculating $\Delta T \cdot i$ as an i-th waiting time (W(i)) before imaging, wherein i is a natural number and $\Delta T$ is a predetermined increment of the waiting time before imaging;

receiving the i-th waiting time (W(i)) before imaging and the position ($P_A$) and velocity ($V_A$) of the satellite at the algorithm execution time ($T_A$) at the satellite-based orbit propagator and calculating an i-th predicted satellite position (Q(i));

calculating an i-th position error (E(i)) corresponding to a difference between the i-th predicted satellite position (Q(i)) and the desired satellite position (P) for imaging; and comparing magnitudes of the i-th position error (E(i)) and an i−1-th position error (E(i−1)), while increasing i from '1' by '1' until the i-th position error (E(i)) is greater than the i−1-th position error (E(i−1)).

9. The apparatus of claim 8, wherein, in order to determine the closest satellite position ($Q_C$) and the closest satellite time ($T_C$), the processor is configured to calculate the closest satellite position ($Q_C$) and the closest satellite time ($T_C$) by using the calculated waiting time (W(i)) before imaging and predicted satellite position (Q(i)).

10. The apparatus of claim 9, wherein the closest satellite position ($Q_C$) and the closest satellite time ($T_C$) are calculated by Mathematical Formulas:

$$W_C = \frac{W(i) + W(i-1)}{2}, \; Q_C = \frac{Q(i) + Q(i-1)}{2}, \; T_C = T_A + W_C.$$

11. The apparatus of claim 9, wherein the closest satellite position ($Q_C$) and the closest satellite time ($T_C$) are calculated by applying a nonlinear interpolation method or a precision filtering method to the calculated waiting time (W(i)) before imaging and predicted satellite position (Q(i)).

12. The apparatus of claim 8, wherein the corrected maneuvering attitude ($\vec{e}$,θ) comprises a maneuvering axis vector ($\vec{e}$) and a maneuvering angle (θ), the maneuvering axis vector ($\vec{e}$) is obtained by Mathematical Formula:

$$\vec{e} = \frac{V_A}{\|V_A\|},$$

the maneuvering angle (θ) is obtained by Mathematical Formula:

$$\theta = a\tan\left(\frac{\|P - Q_C\|}{h}\right),$$

when the ground target is located at a sub-satellite point of the satellite, and the maneuvering angle (θ) is obtained by Mathematical Formula:

$$\theta = a\tan\left(\frac{\|P - Q_C\| + h \cdot a\tan\beta}{h}\right) - \beta,$$

when the ground target is located at a distance away from the sub-satellite point of the satellite by an offset angle β, where h is a distance from the position ($P_A$) obtained at the algorithm execution time ($T_A$) of the satellite to a ground surface.

13. The apparatus of claim 8, wherein the corrected maneuvering attitude ($\vec{e}$,θ) is obtained by reflecting an earth curvature and an orbit curvature of the satellite predicted by the satellite-based orbit propagator.

\* \* \* \* \*